United States Patent
Wang et al.

(10) Patent No.: US 9,531,465 B2
(45) Date of Patent: Dec. 27, 2016

(54) METHOD AND APPARATUS FOR OBTAINING CHANNEL QUALITY INDICATION

(75) Inventors: Gang Wang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 58 days.

(21) Appl. No.: 14/385,064

(22) PCT Filed: Aug. 1, 2012

(86) PCT No.: PCT/CN2012/079508
§ 371 (c)(1),
(2), (4) Date: Dec. 10, 2014

(87) PCT Pub. No.: WO2014/019170
PCT Pub. Date: Feb. 6, 2014

(65) Prior Publication Data
US 2015/0117237 A1    Apr. 30, 2015

(51) Int. Cl.
*H04W 24/08*    (2009.01)
*H04B 7/06*    (2006.01)
(Continued)

(52) U.S. Cl.
CPC ............ *H04B 7/0632* (2013.01); *H04B 7/024* (2013.01); *H04B 7/0617* (2013.01);
(Continued)

(58) Field of Classification Search
None
See application file for complete search history.

(56) References Cited

U.S. PATENT DOCUMENTS

2010/0027456 A1    2/2010 Onggosanusi et al.
2012/0051250 A1    3/2012 Sun et al.
(Continued)

FOREIGN PATENT DOCUMENTS

CN    101841386 A    9/2010

OTHER PUBLICATIONS

Communication dated Jul. 21, 2015 from the Japanese Patent Office in counterpart application No. 2014-560216.
(Continued)

*Primary Examiner* — Hassan Kizou
*Assistant Examiner* — Hashim Bhatti
(74) *Attorney, Agent, or Firm* — Sughrue Mion, PLLC (57) ABSTRACT

Embodiments of the disclosure provide a method and apparatus for obtaining a CQI in a communication system, wherein the communication system comprises a UE, a CoMP measurement set including more than one BS/point, and one or more outside BSs/points which is outside the CoMP measurement set, and wherein the UE is served by a serving BS/point in the CoMP measurement set and interfered by at least one interfering BS/point in the CoMP measurement set and the one or more outside BSs/points. In the method according to embodiments of the present invention, a first interference from at least one outside BS/point which is outside the CoMP measurement set to the UE is estimated; a second interference from at least one interfering BS/point in the CoMP measurement set to the UE is estimated; and a target CQI based on the first interference and the second interference is obtained.

16 Claims, 6 Drawing Sheets

(51) Int. Cl.
   *H04B 7/02*     (2006.01)
   *H04B 17/345*   (2015.01)
   *H04W 72/08*    (2009.01)
   *H04B 17/24*    (2015.01)

(52) U.S. Cl.
   CPC .......... *H04B 17/345* (2015.01); *H04B 17/24* (2015.01); *H04W 72/085* (2013.01)

(56) References Cited

U.S. PATENT DOCUMENTS

| | | | |
|---|---|---|---|
| 2012/0207077 A1* | 8/2012 | Iwai | H04B 7/024 370/312 |
| 2013/0114430 A1* | 5/2013 | Koivisto | H04B 7/024 370/252 |
| 2013/0301432 A1* | 11/2013 | Hammarwall | H04W 24/02 370/252 |
| 2013/0303220 A1* | 11/2013 | Acharya | H04B 7/024 455/509 |
| 2013/0344909 A1* | 12/2013 | Davydov | H04B 7/0689 455/501 |

OTHER PUBLICATIONS

CATT, CQI definition for CoMP, R1-122036, 3GPP, May 12, 2012.
Ericsson, ST-Ericsson, On sounding reference signal enhancements, R1-100056, 3GPP, Jan. 12, 2010.
NEC Group, CQI definition for CoMP TDD system, R1-121332, 3GPP, Mar. 20, 2012.
International Search Report of PCT/CN2012/079508, dated May 9, 2013. [PCT/ISA/210].

* cited by examiner

METHOD AND APPARATUS FOR OBTAINING CHANNEL QUALITY INDICATION

CROSS REFERENCE TO RELATED APPLICATIONS

This application is a National Stage of International Application No. PCT/CN2012/079508 filed Aug. 1, 2012, the contents of which are incorporated herein by reference in their entirety.

FIELD OF THE INVENTION

Embodiments of the present invention generally relate to communication techniques. More particularly, embodiments of the present invention relate to a method and apparatus for obtaining a channel quality indication.

BACKGROUND OF THE INVENTION

3GPP LTE and LTE-Advanced (LTE-A) are one of the next generation cellular communication standards, which create a new series of specifications for the new evolving radio-access technology. In a cellular communication system, a user equipment (UE) at the boundary of a cell generally suffers from signal interference from other cells due to a weak signal, and thereby causes a poor channel quality. To meet the requirements of LTE/LTE-A in the system capacity, instantaneous peak data rate, frequency spectrum, cell-edge user throughput, and delay, etc., the Coordinated Multi-Point (CoMP) technology has been proposed to improve the cell edge UE's performance.

CoMP technology usually incorporates multiple BSs/points to form the cooperating set and dynamic point selection (DPS) selects the best point to serve the UE. By this way, the UE's receiving signal strength is improved while the inter-cell interference is decreased.

In CoMP, CQI definition is a big issue. According to the agreement in 3GPP RAN1 #69, there has been a configuration for channel part and interference part of channel state information (CSI). However, when the interference is measured on interference measurement resource (IMR) while the CoMP scheme is DPS, the problem of CQI mismatching will occur.

R1-121740, "CQI Definition of UE Emulated Intra CoMP Cluster Interference", Ericsson, 3GPP RAN1 #68b has emulated interference transmitted from specified NZP CSI-RS resources, and R1-122835, "Implicit CSI Feedback Framework for DL CoMP", Ericsson, 3GPP RAN1 #69 is an update for R1-121740. In these solutions, one or two NZP CSI-RS (CSI reference signal) resources can be configured, on which ports the UE assumes the transmission of an isotropic signal to be considered as interference in addition to the interference measured on the configured IMR. However, overhead in these solutions are relatively large and the CQI obtained in these solutions is not accurate enough.

In R1-122732, "CSI feedback contents for downlink CoMP", Texas Instruments, 3GPP RAN1 #69, the adjacent cell's CQI is calculated based on some PMI/RI assumptions. However, the actual data transmission in that cell may use a different PMI/RI, which leads to a lower link adaption flexibility and causes some performance loss.

In view of the foregoing problem, there is a need to find a solution for obtaining the CQI in a more accurate and effective way, so as to alleviate CQI mismatching and improve system performance.

SUMMARY OF THE INVENTION

The present invention proposes a solution to obtain the CQI in a communication system employing the CoMP technology. Specifically, the present invention provides a method and apparatus for obtaining the CQI by estimating interferences from base stations (BSs) or points which are in or outside a CoMP measurement set in a more accurate and effective way.

According to a first aspect of the present invention, embodiments of the invention provide a method for obtaining a CQI in a communication system, wherein the communication system comprises a UE, a CoMP measurement set including more than one BS/point, and one or more outside BSs/points which is outside the CoMP measurement set, and wherein the UE is served by a serving BS/point in the CoMP measurement set and interfered by at least one interfering BS/point in the CoMP measurement set and the one or more outside BSs/points. The method may comprise steps of: estimating a first interference from at least one outside BS/point which is outside the CoMP measurement set to the UE; estimating a second interference from at least one interfering BS/point in the CoMP measurement set to the UE; and obtaining a target CQI based on the first interference and the second interference.

According to a second aspect of the present invention, embodiments of the invention provide an apparatus for obtaining a CQI in a communication system, wherein the communication system comprises a UE, a CoMP measurement set including more than one BS/point, and one or more outside BSs/points which is outside the CoMP measurement set, and wherein the UE is served by a serving BS/point in the CoMP measurement set and interfered by at least one interfering BS/point in the CoMP measurement set and the one or more outside BSs/points. The apparatus may comprise: a first estimating unit configured to estimate a first interference from at least one outside BS/point which is outside the CoMP measurement set to the UE; a second estimating unit configured to estimate a second interference from at least one interfering BS/point in the CoMP measurement set to the UE; and an obtaining unit configured to obtain a target CQI based on the first interference and the second interference.

Compared with those existing solutions, the proposed solution effectively relieves the CQI mismatching issue, achieves a competitive CoMP gain with reduced overhead, and improves the system performance.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, the term "BS" is sometimes called as "BS/point" or "point" to be consistent with the 3GPP term. It is to be noted that, the terms "BS/point", "point" and "BS" have the same meaning in this disclosure, and each of them may represent, e.g., a node B (NodeB or NB), an evolved NodeB (eNodeB or eNB), a radio header (RH), a remote radio head (RRH), a relay, a low power node such as a femto, a pico, and so on.

Figure 1:
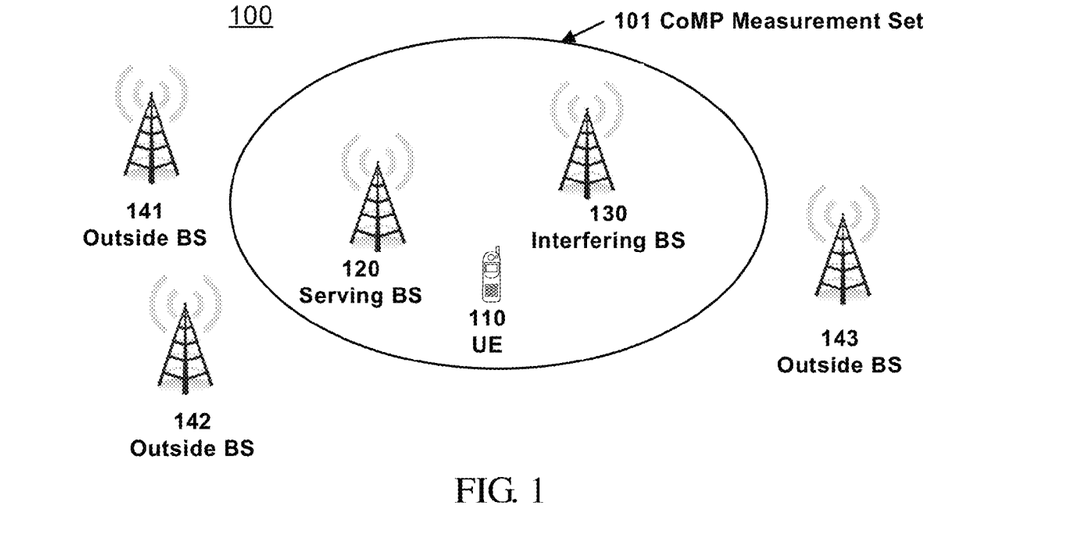
FIG. 1 illustrates a schematic diagram of a communication system employing a CoMP scheme of DPS according to embodiments of the invention.

Reference is first made to FIG. 1, which illustrates a schematic diagram of a communication system 100 employing a CoMP scheme of DPS according to embodiments of the invention.

The communication system 100 comprises a UE 110, a coordinated multi-point (CoMP) measurement set 101 including two BSs 120 and 130, and three BSs, 141, 142 and 143 which are outside the CoMP measurement set. The UE 110 is served by a serving BS 120 in the CoMP measurement set; meanwhile, the UE is interfered by an interfering BS in the CoMP measurement set and the three outside BSs 141, 142 and 143.

It is to be noted that although there are two BSs 120 and 130 shown in the CoMP measurement set 101, more than two BSs may be comprised in the CoMP measurement set. That is to say, besides the interfering BS 130, the UE may be also interfered by other BS in the CoMP measurement set 101.

It is also to be noted that although three outside BSs 141, 142 and 143 have been shown in the communication system 100, there may be less or more points interfering the UE 110 and outside the CoMP measurement set 101. Thus, the UE 110 may be interfered by one or more BSs outside the CoMP measurement set 101.

For better understanding, the following embodiments of the present disclosure are described based on the communication system shown in FIG. 1. As can be appreciated by those skilled in the art, the present disclosure can be applicable to any other suitable communication system, but not limited to the specific arrangement shown in FIG. 1.

Figure 2:
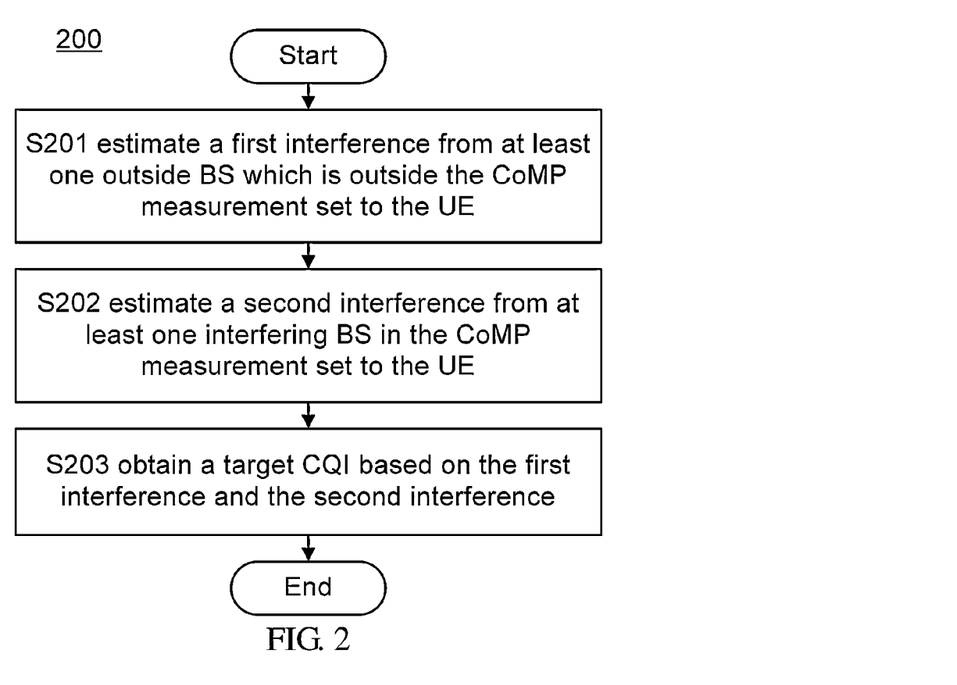
FIG. 2 illustrates a flow chart of a method for obtaining a CQI in a communication system according to embodiments of the invention.

Reference is now made to FIG. 2, which illustrates a flow chart of a method 200 for obtaining a CQI in a communication system according to embodiments of the invention. The communication system may be, for example, implemented as the communication system 100 shown in FIG. 1. The communication system may comprise a UE, a CoMP measurement set including more than one BS, and one or more outside BSs/points which is outside the CoMP measurement set. The UE may be served by a serving BS in the CoMP measurement set and interfered by at least one interfering BS in the CoMP measurement set and the one or more BS outside the CoMP measurement set. In accordance with embodiments of the present invention, method 100 may be carried out by, for example, a serving BS, a central unit, or any other suitable device in the communication system.

After method 200 starts, at step S201, a first interference is estimated from at least one outside BS which is outside the CoMP measurement set to the UE.

According to embodiments of the present invention, there may be several ways to estimate the first interference, e.g., interference from the outside BSs 141, 142 and 143.

In accordance with embodiments of the present invention, channel information of a channel from the serving BS/point to the UE may be measured, CQIs indicating quality of channels from BSs/points in the CoMP measurement set to the UE may be acquired, and then the first interference may be estimated based on the measured channel information and the acquired CQIs. Relevant details may be found in descriptions with respect to FIG. 3.

In accordance with other embodiments of the present invention, channel information of a channel from the serving BS/point to the UE may be measured; a CQI indicating quality of a channel from a reference BS/point to the UE may be acquired, wherein the reference BS/point belongs to the at least one interfering BS/point in the CoMP measurement set; and a transmission power of the reference BS/point to the UE, a transmission power of the serving BS/point to the UE, a path loss of the reference BS/point to the UE, and a path loss of the serving BS/point to the UE may be acquire; and the first interference may be estimated based on the measured channel information, the acquired CQI, the transmission power of the reference BS/point to the UE, the transmission power of the serving BS/point to the UE, the path loss of the reference BS/point to the UE, and the path loss of the serving BS/point to the UE. Relevant details may be found in descriptions in connection to FIG. 4.

At step S202, a second interference is estimated from at least one interfering BS in the CoMP measurement set to the UE.

In accordance with embodiments of the present invention, the second interference may be estimated in several ways. For example, by acquiring a beamforming matrix for transmission from the at least one interfering BS/point to the UE, and acquiring transmission powers of BSs/points in the CoMP measurement set to the UE, path losses of the BSs/points in the CoMP measurement set to the UE, and channel information of a channel from the at least one interfering BS/point to the UE, the second interference may be estimated based on the transmission powers of the BSs/points in the CoMP measurement set to the UE, the path losses of the BSs/points in the CoMP measurement set to the UE, the acquired beamforming matrix and the acquired channel information. Details may be found in descriptions with respect to FIG. 5.

At step S203, a target CQI is obtained based on the first interference and the second interference.

The target CQI indicates a CQI that matches the communication system with the CoMP scheme of DPS. The target CQI represents an actual channel quality of the channel between the UE and its serving BS or point by considering inferences from both in and outside the CoMP measurement set. By obtaining the target CQI, the CQI mismatching problem in the prior art will be solved or relieved effectively.

In accordance with embodiments of the present invention, the target CQI may be obtained by, for example, calculating beamforming gain from the serving BS/point to the UE; calculating quality of a channel from the serving BS/point to the UE according to the first interference, the second interference and the beamforming gain; and obtaining the target CQI based on the calculated quality. Details may be found in descriptions with respect to FIG. 6.

In accordance with some other embodiments of the present invention, the target CQI may be obtained by, for example, calculating beamforming gain from the serving BS/point to the UE; updating the second interference based on scheduling of the UE by the at least one interfering BS; and calculating the quality of a channel from the serving BS/point to the UE according to the first interference, the updated second interference and the beamforming gain. Details may be found in descriptions in connection with FIG. 7.

It is to be noted that there may be some other solutions for obtaining the target CQI based on the first interference and the second interference, and the above embodiments are described for illustration, not limitation.

Figure 3:
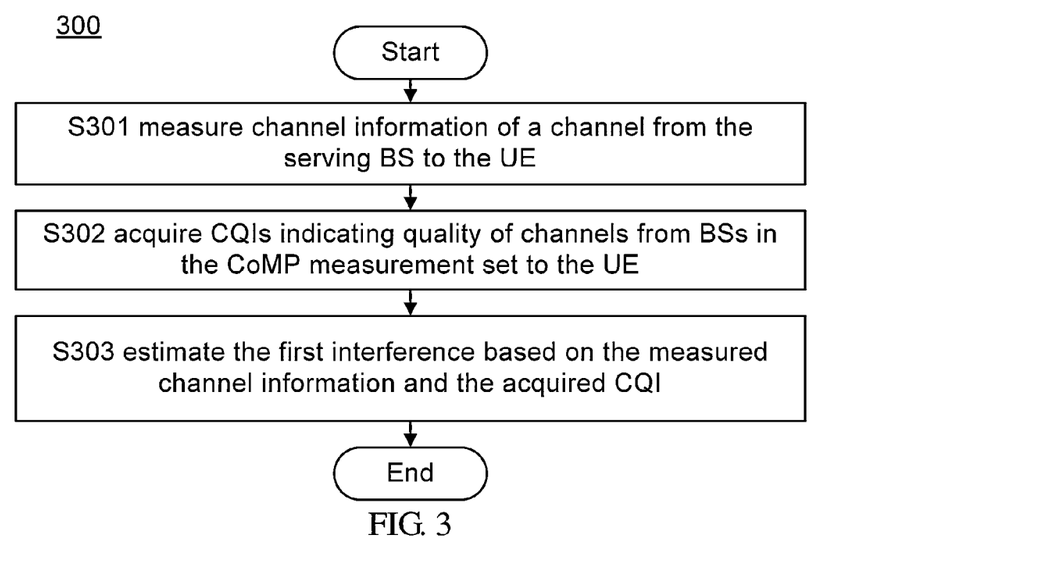
FIG. 3 illustrates a flow chart of a method for estimating a first interference from outside BS(s) according to embodiments of the invention.

FIG. 3 illustrates a flow chart of a method 300 for estimating a first interference from outside BS(s) according to embodiments of the invention. The flow chart as shown in FIG. 3 illustrates a process of the first interference estimation, which is an embodiment for implementing step S201 of the method illustrated in FIG. 2.

At step S301, channel information of a channel from the serving BS to the UE is measured.

In accordance with some other embodiments of the present invention, an uplink sounding reference signal (SRS) may be received from the UE, and then the channel information may be measured based on the uplink SRS. For example, according to the uplink SRS, the channel information, such as a downlink channel matrix, may be obtained. Those skilled in the art will understand that there may be several means for measuring the channel information and the embodiment aforesaid is an example rather than limitation.

At step S302, CQIs indicating quality of channels from BSs/points in the CoMP measurement set to the UE are acquired.

According to embodiments of the present invention, the UE does not consider any interference from the CoMP measurement set. As such, the UE measures interference from one or more BSs outside the CoMP measurement set and reports a CQI, which indicates the channel quality of the channel from one of the BSs in the CoMP measurement set, to its serving BS based on the measured interference. Thus, in the CoMP scheme of DPS, the CQI reported from the UE may not reflect the interference from interfering BS(s) in the CoMP measurement set, which leads to the CQI mismatch problem. In embodiments of the present invention, the CQIs reported from the UE are acquired for estimating the interference outside the CoMP measurement set, so that a target CQI may be obtained by considering both interferences in and outside the CoMP measurement set to overcome the CQI mismatch problem.

In some embodiments, assuming there are N BSs in the CoMP measurement set, the CQIs indicating quality of channels from BSs/points in the CoMP measurement set to the UE may include N CQIs corresponding to respective BSs in the CoMP measurement set. For the communication system 100 in which N=2, the CQIs acquired at step S302 may comprise a first CQI corresponding to the serving BS 120 and a second CQI corresponding to the interfering BS 130.

At step S303, the first interference is estimated based on the measured channel information and the acquired CQIs.

According to embodiments of the present invention, an antenna virtualization matrix is assumed. It is noted that the antenna virtualization matrix is introduced for a better coverage in downlink transmission, which should not be construed as limitation to the present invention. The antenna virtualization matrix may be preset or predetermined, e.g., according to the communication system configurations and/or requirements, experiences of the operator, the provider, the vendor, etc.

Based on the CQIs at step S302, signal to noise and interference ratios (SINR) may be obtained by a CQI-SINR lookup table or any suitable means known for those skilled in the art. For the communication system 100 in which N=2, there are two SINRs may be obtained based on the acquired two CQIs.

In the embodiments, it is assumed that the communication system has several UEs and the $i^{th}$ UE is under consideration. It is also assumed that there are N BSs in the CoMP measurement set, there are K BSs outside the CoMP measurement set, the $i^{th}$ UE is served by the $m^{th}$ BS in the CoMP measurement set, and the UE is interfered by N−1 BSs in the CoMP measurement set except for the $m^{th}$ BS. For example, in the communication system shown in FIG. 1, N=2, K=3.

In the embodiments, the antenna virtualization matrix is denoted as $W_{i,0}$ and the channel matrix measured at step S301 is denoted as $H_{m,i}$ and the SINR corresponding to the $n^{th}$ BS in the CoMP measurement set is denoted as $SINR_{n,1}$. The first interference comprises interference caused by all the K outside BSs. With respect to the $n^{th}$ BS in the CoMP measurement set, a candidate for the first interference may be denoted as $\beta_{i,1}^{n}$ and may be calculated by:

$$\beta_{i,1}^{n} = \frac{\|H_{m,i}W_{i,0}\|^2}{SINR_{n,i}}. \tag{1}$$

According to the calculated N candidates for the first interference, the first interference (denoted as denoted as $\beta_{i,1}$) may be determined, for example, by selecting the maximum one from the N candidates as the first interference, by randomly selecting one of the N candidates as the first interference, by averaging the values of the N candidates and taking the average value as the first interference, or by any other appropriate means.

For example, with respect to the communication system 100 in which there are two BSs in the CoMP measurement set, i.e., the serving BS 120 and the interfering BS 130, a first candidate $\beta_{i,1}^1$ of the first interfering may be estimated based on the CQI which indicates the channel quality of the channel from the serving BS 120 to the UE, and a second candidate $\beta_{i,1}^2$ of the first interfering may be estimated based on the CQI which indicates the channel quality of the channel from the interfering BS 130 to the UE. The first interference $\beta_{i,1}$ may be determined as the first candidate $\beta_{i,1}^1$, the second candidate $\beta_{i,1}^2$, average of the first candidate and the second candidate, or any suitable value obtained based on the first candidate and the second candidate.

Figure 4:
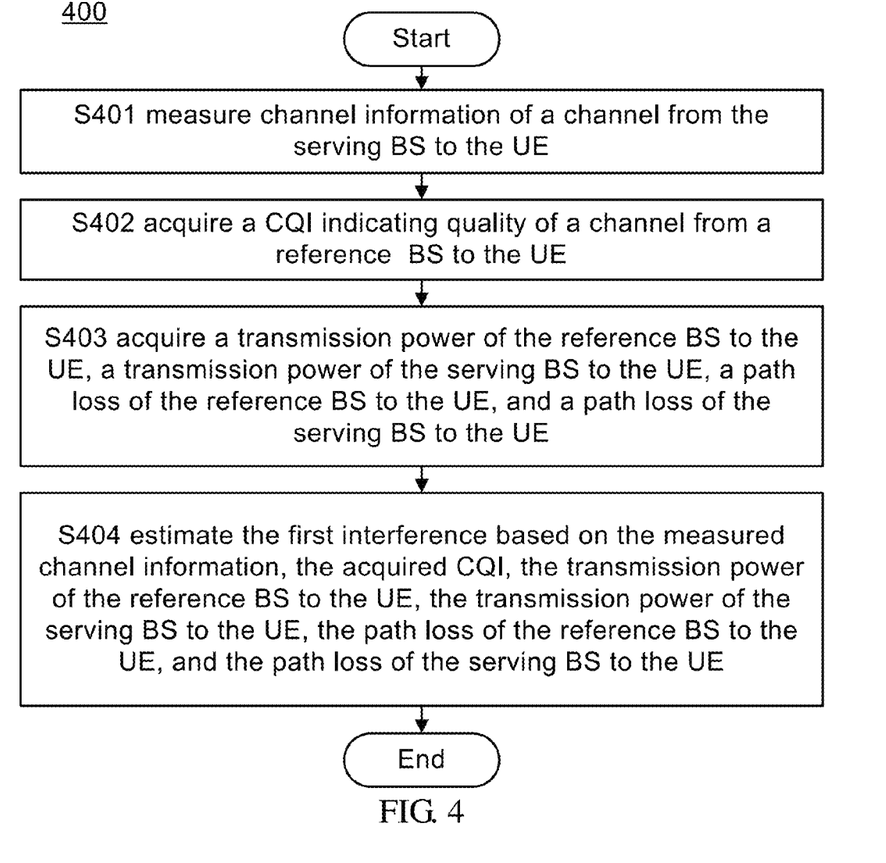
FIG. 4 illustrates a flow chart of a method for estimating a first interference from outside BS(s) according to embodiments of the invention.

FIG. 4 illustrates a flow chart of a method 400 for estimating a first interference from outside BS(s) according to embodiments of the invention. The flow chart as shown in FIG. 4 illustrates a process of the first interference estimation, which is another embodiment for implementing step S201 of the method illustrated in FIG. 2.

At step S401, channel information of a channel from the serving BS to the UE is measured.

Step S401 in method 400 corresponds to step S301 in method 300 as described above. Similar with step S301, the measurement at step S401 may be done by receiving an uplink SRS from the UE and measuring the channel information based on the uplink SRS.

At step S402, a CQI indicating quality of a channel from a reference BS to the UE is acquired.

Different from the embodiments shown with respect to FIG. 3, the UE only reports one CQI corresponding to a reference BS instead of reporting all K CQIs corresponding to the K outside BSs respectively. According to embodiments of the present invention, the reference BS belongs to the at least one interfering BS in the CoMP measurement set and may be any one of the at least one interfering BS.

Upon receiving the CQI corresponding to the reference BS, the serving BS may obtain a reference SINR by a CQI-SINR lookup table or any suitable means known for those skilled in the art. In the embodiments, the reference SINR may be denoted as $SINR_{r,0}$.

At step S403, a transmission power of the reference BS to the UE, a transmission power of the serving BS to the UE, a path loss of the reference BS to the UE, and a path loss of the serving BS to the UE are acquired.

In the embodiments, it is assumed that the communication system has several UEs and the $i^{th}$ UE is under consideration, there are N BSs in the CoMP measurement set, there are K BSs outside the CoMP measurement set, the $i^{th}$ UE is served by the $m^{th}$ BS in the CoMP measurement set, and the UE is interfered by N−1 BSs in the CoMP measurement set except for the $m^{th}$ BS. For example, in the communication system 100 shown in FIG. 1, N=2, K=3, and the reference BS is the interfering BS 130.

The transmission power of the reference BS to the UE, the transmission power of the serving BS to the UE, the path loss of the reference BS to the UE, and the path loss of the serving BS to the UE may be acquired by the serving BS from the central unit or any other appropriate device in the communication system. In some embodiments, the method according to the present invention may be preformed at the central unit. In this case, the central unit may collect the transmission power of the reference BS to the UE, the transmission power of the serving BS to the UE, the path loss of the reference BS to the UE, and the path loss of the serving BS to the UE may be collected by the central unit, estimates the first interference and the second interference, and obtains the target CQI. The BSs in the communication system may communicate with the central unit to obtain the target CQI, i.e., the CQI obtained based on both interferences in and outside the CoMP measurement set.

At step S404, the first interference is estimated based on the measured channel information, the acquired CQI, the transmission power of the reference BS to the UE, the transmission power of the serving BS to the UE, the path loss of the reference BS to the UE, and the path loss of the serving BS to the UE.

According to embodiments of the present invention, the measured channel information (e.g., the channel matrix from the serving BS to the UE) is denoted as $H_{r,i}$, the SINR corresponding to the acquired CQI is the reference SINR and is denoted as $SINR_{r,0}$, the transmission power of the reference BS to the UE is denoted as $P_r$, the transmission power of the serving BS to the UE is denoted as $P_m$, the path loss of the reference BS to the UE is denoted as $P_{loss,r,i}$, and the path loss of the serving BS to the UE is denoted as, the first interference $\beta_{i,1}$ may be calculated by:

$$\beta_{i,1} = \frac{P_r P_{loss,r,i}}{P_m P_{loss,m,i}} \frac{\|H_{r,i} W_{i,0}\|^2}{SINR_0}. \qquad (2)$$

It is advantageous to acquire one CQI indicating quality of a channel from a reference BS to the UE, instead of acquiring a plurality of CQIs indicating quality of channels from BSs in the CoMP measurement set to the UE. In this way, only one CQI needs to be reported from the UE. As such, overhead for transmission of many CQIs are effectively reduced.

It is to be noted that the first interference may be estimated in several ways besides the embodiments illustrated in connection with FIGS. 3 and 4. Those skilled in the art will appreciate that the aforesaid embodiments and equations (1) and (2) are only for illustration not limitation.

Figure 5:
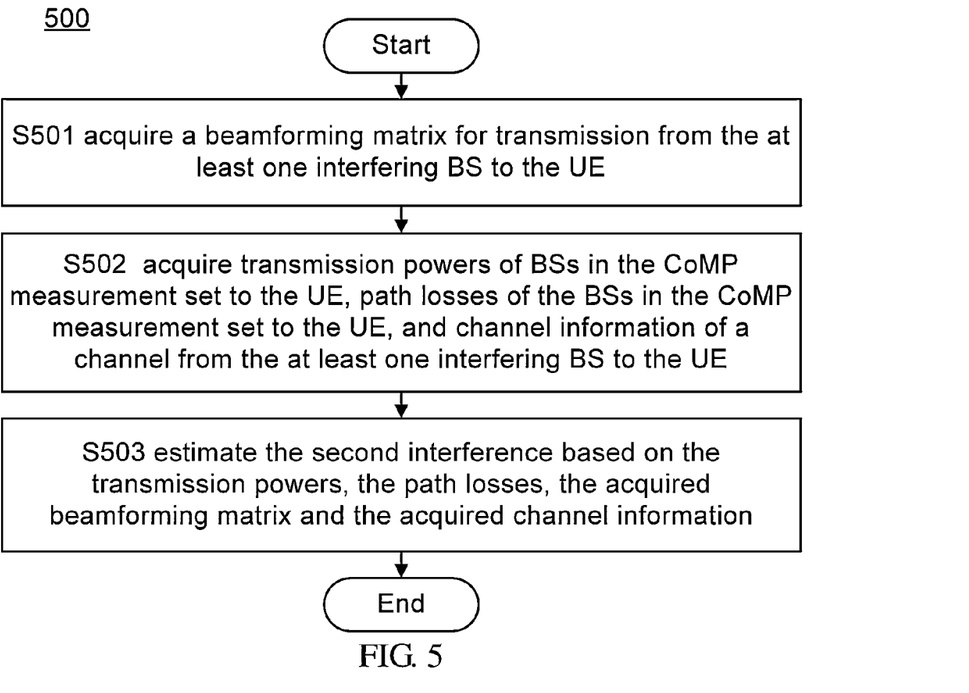
FIG. 5 illustrates a flow chart of a method for estimating a second interference from interfering BS(s) in the CoMP measurement set according to embodiments of the invention.

FIG. 5 illustrates a flow chart of a method 500 for estimating a second interference from interfering BS(s) in the CoMP measurement set according to embodiments of the invention. The flow chart as shown in FIG. 5 illustrates a process of the second interference estimation, which is an embodiment for implementing step S202 of the method illustrated in FIG. 2.

At step S501, a beamforming matrix for transmission from the at least one interfering BS to the UE is acquired.

Similar to embodiments described in connection with FIGS. 3 and 4, it is assumed that the communication system has several UEs, the $i^{th}$ UE is under consideration, there are N BSs in the CoMP measurement set, there are K BSs outside the CoMP measurement set, the $i^{th}$ UE is served by the $m^{th}$ BS in the CoMP measurement set, and the UE is interfered by N−1 BSs in the CoMP measurement set except for the $m^{th}$ BS.

In accordance with embodiments of the present invention, the beamforming matrix acquired at step S501 may be a beamforming matrix used by BS j in the last subframe, wherein the BS j indicates the $j^{th}$ interfering BS/point in the CoMP measurement set, j≠m, and the serving BS is the $m^{th}$ point in the CoMP measurement set. In the embodiments, the beamforming matrix for transmission from the at least one interfering BS to the UE is denoted as $W_j$.

At step S502, transmission powers of BSs in the CoMP measurement set to the UE, path losses of the BSs in the CoMP measurement set to the UE, and channel information of a channel from the at least one interfering BS to the UE are acquired.

In accordance with embodiments of the present invention, transmission powers of BSs in the CoMP measurement set to the UE includes the transmission power of the serving 13S to the UE (denoted as $p_m$) and transmission powers of respective interfering BSs in the CoMP measurement set to the UE (denoted as $P_j$, wherein j=1,2, . . . , N and j≠m). The path losses of the BSs in the CoMP measurement set to the UE includes the path loss of the path from the serving BS to the UE (denoted as $P_{loss, m,i}$) and path losses of respective interfering BSs in the CoMP measurement set to the UE (denoted as $P_{loss,j,i}$). Additionally, the channel information of a channel from the at least one interfering BS to the UE may comprise a channel matrix of the $j^{th}$ BS to the UE, wherein the channel matrix may be denoted as $H_{j,i}$ j=1,2, . . . , N and j≠m.

According to embodiments of the present invention, the transmission powers of BSs in the CoMP measurement set to the UE, the path losses of the BSs in the CoMP measurement set to the UE, and the channel information of a channel from the at least one interfering BS to the UE may be acquired by the serving BS from the central unit or any other appropriate device in the communication system. In some embodiments, the method according to the present invention may be preformed at the central unit. In this case, the central unit may collect the above parameters to obtain the target CQI. The BSs in the communication system may communicate with the central unit to obtain the target CQI, i.e., the CQI obtained based on both interferences in and outside the CoMP measurement set.

At step S503, the second interference is estimated based on the transmission powers, the path losses, the acquired beamforming matrix and the acquired channel information.

In accordance with embodiments of the present invention, the second interference $\beta_{i,1}$, i.e., interference brought by the BSs in the CoMP measurement set, may be estimated by:

$$\beta_{i,2} = \sum_{j=1, j \neq m}^{N} \frac{P_j P_{loss,j,i}}{P_m P_{loss,m,i}} \|H_{j,i} W_j\|^2 \qquad (3)$$

It is to be noted that the second interference may be estimated in several ways. Those skilled in the art will appreciate that the aforesaid embodiments and equation (3) are only for illustration not limitation.

Figure 6:
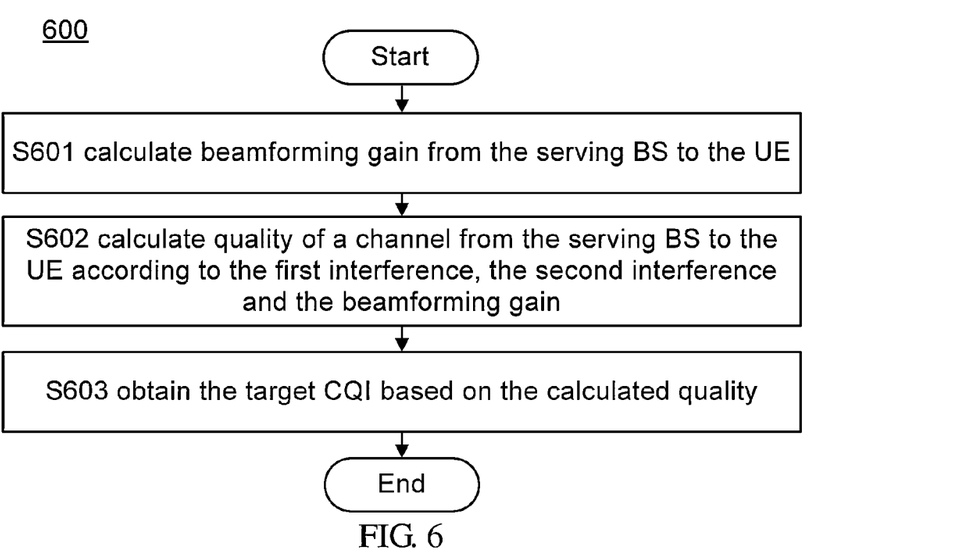
FIG. 6 illustrates a flow chart of a method for obtaining the CQI according to embodiments of the invention.

FIG. 6 illustrates a flow chart of a method 600 for obtaining the CQI according to embodiments of the invention. The flow chart as shown in FIG. 6 illustrates an embodiment of obtaining the target CQI based on the first interference estimated according method of FIG. 3 or FIG. 4 and the second interference estimation estimated according method of FIG. 5. The method 600 illustrates an embodiment for implementing step S203 of the method illustrated in FIG. 2.

At step S601, beamforming gain from the serving BS to the UE is calculated.

In accordance with embodiments of the present invention, the beamforming gain may be obtained based on the channel information of the channel from the serving BS to the UE. The channel information of the channel from the serving BS to the UE may be obtained similar with step S301. Specifically, in some embodiments, an uplink SRS may be received from the UE, and then the channel information may be measured based on the uplink SRS. For example, according to the uplink SRS, a downlink channel matrix may be obtained and denoted as Based on the channel matrix of the channel from the serving BS to the UE, the beamforming gain for cell transmission to the UE may be calculated according to some existing methods, such as Singular Value Decomposition (SVD), Eigen Value Decomposition (EVD), and so on. In some embodiments, the beamforming gain calculated at step S601 may be denoted as $\gamma_i$.

At step S602, quality of a channel from the serving BS to the UE is calculated according to the first interference, the second interference and the beamforming gain.

According to embodiments of the present invention, "channel quality" or "quality of a channel" may comprise information which reflects the quality of the channel from the BS to the UE. For example, the channel quality may comprise signal to interference plus noise ratio (SINR), Signal to Noise Ratio (SNR), Signal to Interference Ratio (SIR), Carrier to Interference plus Noise Ratio (CINR), Carrier to Noise Ratio (CNR), and so on. In embodiments described in connection with FIG. 6, the channel quality is exemplarily comprises SINR. It is to be noted that, in other embodiments of the present invention, the channel quality information may further comprise SNR, SIR, CINR, CNR or any combination of SINR, SNR, SIR, CINR, and CNR.

In accordance with embodiments of the present invention, the quality of the channel from the serving BS to the UE may be calculated by:

$$SINR_i = \frac{\gamma_i}{\beta_i}, \qquad (4)$$

where $\gamma_i$ indicates the beamforming gain from the serving BS to the UE, and represents the total interference from the interfering BS(s) in the CoMP measurement set to the UE and from outside BS(s) to the UE.

According to embodiments of the present invention, the total interference $\beta_i$ may be obtained in several ways. In some embodiments, the total interference $\beta_i$ may be obtained by directly summating interference from the interfering BS(s) in the CoMP measurement set to the UE (i.e., the first interference) and interference from the outside BS(s) to the UE (i.e., the second interference) as below:

$$\beta_i = \beta_{i,1} + \beta_{i,2}, \qquad (5)$$

where $\beta_{i,1}$ represents the first interference which may be, e.g., estimated according to embodiments illustrated by FIGS. 3 and 4, and $\beta_{i,2}$ represents the second interference which may be, e.g., estimated according to embodiments illustrated by FIG. 5.

In some other embodiments, the total interference $\beta_i$ may be obtained by weighting the first interference and the second interference respectively and summating the weighted first interference and the weighted second interference. For example, the total interference $\beta_i$ may be obtained by:

$$\beta_i = w_{i,1} \cdot \beta_{i,1} + w_{i,2} \cdot \beta_{i,2}, \qquad (6)$$

where $\beta_{i,1}$ represents the first interference, $\beta_{i,2}$ represents the second interference, $w_{i,1}$ represents a first weight applied to the first interference, and $w_{i,2}$ represents a second weight applied to the second interference. According to embodiments of the present invention, the weights $w_{i,1}$ and $w_{i,2}$ may be preset according to actual conditions of the communication system, predetermined according to experience or preference of the operator or those skilled in the art, and so on. The preset or predetermination of the first weight or the second weigh may be static or dynamical.

At step S603, the target CQI is obtained based on the calculated quality.

Based on the quality of the channel from the serving BS to the UE calculated at step S602, the corresponding CQI may be obtained by a CQI-SINR lookup table or any suitable means known for those skilled in the art. In this way, the target CQI may be obtained.

Figure 7:
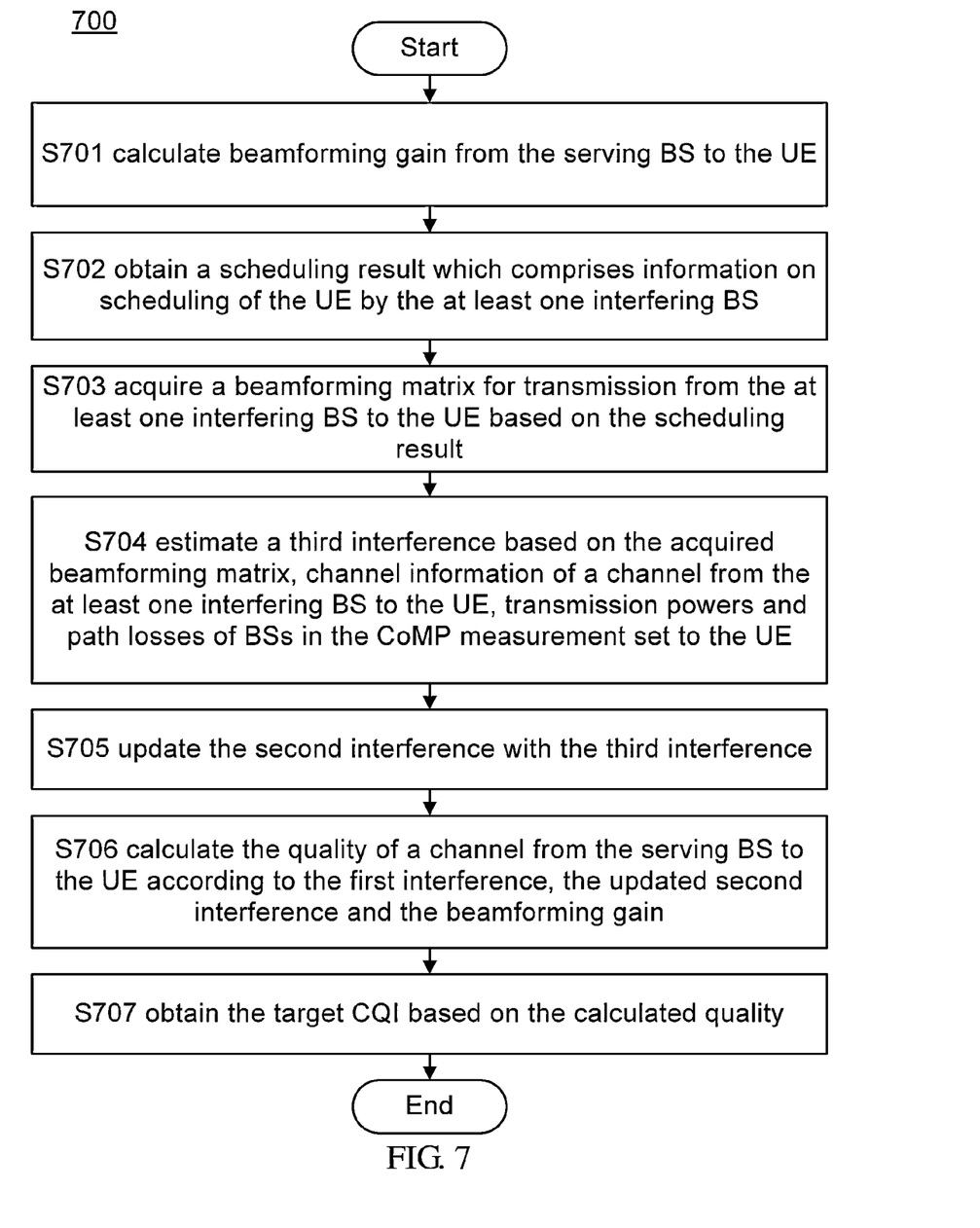
FIG. 7 illustrates a flow chart of a method for obtaining the CQI according to embodiments of the invention.

FIG. 7 illustrates a flow chart of a method 700 for obtaining the CQI according to embodiments of the invention. The flow chart as shown in FIG. 7 illustrates another embodiment of obtaining the target CQI based on the first interference estimated according method of FIG. 3 or FIG. 4 and the second interference estimation estimated according method of FIG. 5. The method 700 illustrates another embodiment for implementing step S203 of the method illustrated in FIG. 7, in which the second interference is updated based on scheduling of the UE by the at least one interfering BS and the quality of a channel from the serving BS/point to the UE is calculated according to the first interference, the updated second interference and the beamforming gain. In this way, the accuracy for estimating the second interference may be significantly improved.

At step S701, beamforming gain from the serving BS to the UE is calculated.

Step S701 in method 700 corresponds to step S601 in method 600 as described above. Similar with step S601, at step S701, the beamforming gain may be obtained based on the channel information of the channel from the serving BS to the UE by means of algorithms such as Singular Value Decomposition (SVD), Eigen Value Decomposition (EVD), and so on.

At step S702, a scheduling result which comprises information on scheduling of the UE by the at least one interfering BS is obtained.

For each BS in the CoMP measurement set, it may schedule UE(s) which are potentially to be served. After such scheduling, the UE(s) will be allocated certain resource by the scheduling BS. According to embodiments of the present invention, the scheduling result may comprise information on scheduling of the UE by one of the one or more interfering BSs. For the communication system 100, the scheduling result may comprise information on scheduling of the UE by the interfering BS 130. For example, the information on resource allocation to the UE 110 may be obtained at step S702.

At step S703, a beamforming matrix for transmission from the at least one interfering BS to the UE is acquired based on the scheduling result.

It is to be noted that, the beamforming matrix acquired at step S501 is a beamforming matrix used by a BS in the last subframe. Differently, the beamforming matrix acquired at step S703 is used by a BS in the current subframe. That is, the beamforming matrix acquired at step S703 is more accurate for estimating the second interference than that acquired at step S501.

In accordance with embodiments of the present invention, the beamforming matrix may be obtained by means of Singular Value Decomposition (SVD), Eigen Value Decomposition (EVD), and so on, based on the channel information of the channel from the serving BS to the UE in the current subframe.

At step S704, a third interference is estimated based on the acquired beamforming matrix, channel information of a channel from the at least one interfering BS to the UE, transmission powers and path losses of BSs in the CoMP measurement set to the UE.

In accordance with embodiments of the present invention, the third interference $\beta_{i,3}$, i.e., interference brought by the BSs in the CoMP measurement set, may be estimated by:

$$\beta_{i,3} = \sum_{j=1, j \neq m}^{N} \frac{P_j P_{loss,j,i}}{P_m P_{loss,m,i}} \|H_{j,i} \tilde{W}_j\|^2 \qquad (7)$$

Where, $P_m$ represents the transmission power of the serving BS (e.g., the $m^{th}$ BS in the CoMP measurement set) to the UE; $P_j$ represents the transmission powers of respective interfering BSs in the CoMP measurement set to the UE (j=1,2, . . . , N and j≠m); $P_{loss,m,i}$ represents the path loss of the path from the serving BS to the UE; $P_{loss,j,i}$ represents the path losses of respective interfering BSs in the CoMP measurement set to the UE; $H_{j,i}$ represents the channel information of a channel from the at least one interfering BS to the UE, e.g., a channel matrix of the $j^{th}$ BS to the UE; and $\tilde{W}_j$ represents the beamforming matrix for transmission from the $j^{th}$ BS to the UE in the current subframe.

At step S705, the second interference is updated with the third interference.

According to embodiments of the present invention, the updating process may be implemented by using the following equation:

$$\beta_{i,2} = \beta_{i,3} \qquad (8)$$

Compared with the second interference estimated by using the beamforming matrix corresponding to the last subframe, the updated second interference is more accurate and more adapted to the actual transmission conditions. It is to be noted that, the updating process for second interference is optional. In other words, the method for obtaining the CQI according to the present invention may be performed without updating the second interference with the third interference.

At step S706, the quality of a channel from the serving BS to the UE is calculated according to the first interference, the updated second interference and the beamforming gain.

Step S706 in method 700 corresponds to step S602 in method 600 as described above. Similar with step S602, at step S706, the quality of a channel from the serving BS to the UE may be calculated by equation (4), wherein the total interference recited in the equation (4) may be obtained based on the second interference updated through steps S702-S705 and the first interference.

At step S707, the target CQI is obtained based on the calculated quality.

Step S707 in method 700 corresponds to step S603 in method 600 as described above. Similar with step S603, the target CQI may be obtained by a CQI-SINR lookup table or any suitable means known for those skilled in the art at step S707.

Figure 8:
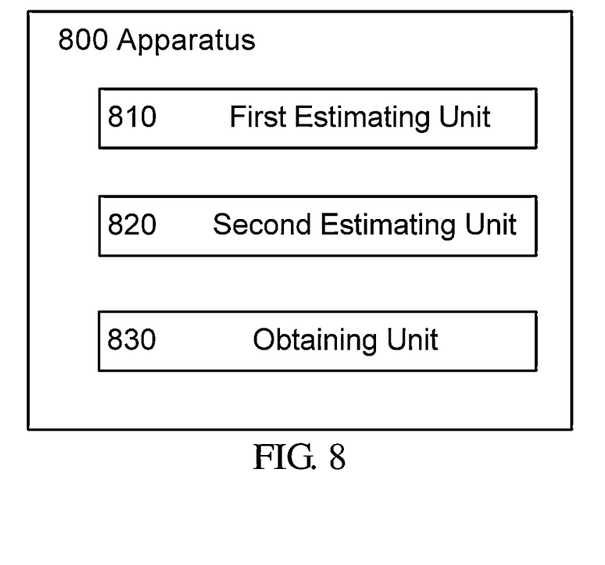
FIG. 8 illustrates a block diagram of an apparatus for obtaining a CQI in a communication system according to embodiments of the invention.

Reference is now made to FIG. 8, which illustrates a block diagram of an apparatus 800 for obtaining a CQI in a communication system according to embodiments of the invention. In these embodiments, the communication system may comprise a UE, a CoMP measurement set including more than one base station (BS)/point, and one or more outside BSs/points which is outside the CoMP measurement set, wherein the UE may be served by a serving BS/point in the CoMP measurement set and interfered by at least one interfering BS/point in the CoMP measurement set and the one or more outside BSs/points. The apparatus 800 as illustrated in FIG. 8 may be implemented at a serving BS, a central unit, or any other suitable device in the communication system.

According to embodiments of the present invention, the apparatus 800 may comprise: a first estimating unit 810 configured to estimate a first interference from at least one outside BS/point which is outside the CoMP measurement set to the UE; a second estimating unit 820 configured to estimate a second interference from at least one interfering BS/point in the CoMP measurement set to the UE; and an obtaining unit 830 configured to obtain a target CQI based on the first interference and the second interference.

According to embodiments of the present invention, the first estimating unit 810 may comprise: first measuring means configured to measure channel information of a channel from the serving BS/point to the UE; first acquiring means configured to acquire CQIs indicating quality of channels from BSs/points in the CoMP measurement set to the UE; and first estimating means configured to estimate the first interference based on the measured channel information and the acquired CQIs.

According to embodiments of the present invention, the first estimating unit 810 may comprise: third measuring means configured to measure channel information of a channel from the serving BS/point to the UE; second acquiring means configured to acquire a CQI indicating quality of a channel from a reference BS/point to the UE, wherein the reference BS/point belongs to the at least one interfering BS/point in the CoMP measurement set; third acquiring means configured to acquire a transmission power of the reference BS/point to the UE, a transmission power of the serving BS/point to the UE, a path loss of the reference BS/point to the UE, and a path loss of the serving BS/point to the UE; and second estimating means configured to estimate the first interference based on the measured channel information, the acquired CQI, the transmission power of the reference BS/point to the UE, the transmission power of the serving BS/point to the UE, the path loss of the reference BS/point to the UE, and the path loss of the serving BS/point to the UE.

According to embodiments of the present invention, the first measuring means or the third measuring means may comprise: receiving means configured to receive an uplink sounding reference signal from the UE; and second measuring means configured to measure the channel information based on the uplink sounding reference signal.

According to embodiments of the present invention, the second estimating unit 820 may comprise: fourth acquiring means configured to acquire a beamforming matrix for transmission from the at least one interfering BS/point to the UE; fifth acquiring means configured to acquire transmission powers of BSs/points in the CoMP measurement set to the UE, path losses of the BSs/points in the CoMP measurement set to the UE, and channel information of a channel from the at least one interfering BS/point to the UE; and third estimating means configured to estimate the second interference based on the transmission powers of the BSs/points in the CoMP measurement set to the UE, the path losses of the BSs/points in the CoMP measurement set to the UE, the acquired beamforming matrix and the acquired channel information.

According to embodiments of the present invention, the obtaining unit 830 may comprise: first calculating means configured to calculate beamforming gain from the serving BS/point to the UE; second calculating means configured to calculate quality of a channel from the serving BS/point to the UE according to the first interference, the second interference and the beamforming gain; and first obtaining means configured to obtain the target CQI based on the calculated quality.

According to embodiments of the present invention, the second calculating means may comprise: first updating means configured to update the second interference based on scheduling of the UE by the at least one interfering BS; and third calculating means configured to calculate the quality of a channel from the serving BS/point to the UE according to the first interference, the updated second interference and the beamforming gain.

According to embodiments of the present invention, the first updating means may comprise: second obtaining means configured to obtain a scheduling result which comprises information on scheduling of the UE by the at least one interfering BS; sixth acquiring means configured to acquire a beamforming matrix for transmission from the at least one interfering BS/point to the UE based on the scheduling result; fourth estimating means configured to estimate a third interference based on the acquired beamforming matrix, channel information of a channel from the at least one interfering BS/point to the UE, transmission powers of BSs/points in the CoMP measurement set to the UE, and path losses of the BSs/points in the CoMP measurement set to the UE; and second updating means configured to update the second interference with the third interference.

It is noted that the apparatus 800 may be configured to implement functionalities as described with reference to FIGS. 2-7. Therefore, the features discussed with respect to any of methods 200, 300, 400, 500, 600 and 700 may apply to the corresponding components of the apparatus 800. It is further noted that the components of the apparatus 800 may be embodied in hardware, software, firmware, and/or any combination thereof. For example, the components of the apparatus 800 may be respectively implemented by a circuit, a processor or any other appropriate selection device. Those skilled in the art will appreciate that the aforesaid examples are only for illustration not limitation.

In some embodiment of the present disclosure, the apparatus 800 comprises at least one processor. The at least one processor suitable for use with embodiments of the present disclosure may include, by way of example, both general and special purpose processors already known or developed in the future. The apparatus 800 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compilable or interpretable programming languages. In accordance with embodiments, the computer executable instructions may be configured, with the at least one processor, to cause the apparatus 800 to at least perform according to any of methods 200-700 as discussed above.

In view of the above, those skilled in the art will appreciate that with the methods and/or apparatus according to embodiments of the present invention, the CQI mismatching problem in the CoMP scheme of DPS is overcome, the overhead for the communication system is effectively reduce and the system performance is significantly improved.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-7 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for obtaining a Channel Quality Indication (CQI) in a communication system, wherein the communication system comprises a user equipment (UE), a coordinated multi-point (CoMP) measurement set including more than one base station (BS)/point, and one or more outside BSs/points which is outside the CoMP measurement set, and wherein the UE is served by a serving BS/point in the CoMP measurement set and interfered by at least one interfering BS/point in the CoMP measurement set and the one or more outside BSs/points, the method comprising:
   estimating a first interference from at least one outside BS/point which is outside the CoMP measurement set to the UE;
   estimating a second interference from at least one interfering BS/point in the CoMP measurement set to the UE; and
   obtaining a target CQI based on the first interference and the second interference,
      wherein estimating the first interference from the at least one outside BS/point which is outside the CoMP measurement set to the UE comprises:
         measuring channel information of a channel from the serving BS/point to the UE;
         acquiring CQIs indicating quality of channels from BSs/points in the CoMP measurement set to the UE; and
         estimating the first interference based on the measured channel information and the acquired CQIs.

2. The method of claim 1, wherein estimating the first interference from the at least one outside BS/point which is outside the CoMP measurement set to the UE further comprises:
   acquiring a CQI indicating quality of a channel from a reference BS/point to the UE, wherein the reference BS/point belongs to the at least one interfering BS/point in the CoMP measurement set;
   acquiring a transmission power of the reference BS/point to the UE, a transmission power of the serving BS/point to the UE, a path loss of the reference BS/point to the UE, and a path loss of the serving BS/point to the UE; and
   estimating the first interference based on the measured channel information, the acquired CQI, the transmission power of the reference BS/point to the UE, the transmission power of the serving BS/point to the UE, the path loss of the reference BS/point to the UE, and the path loss of the serving BS/point to the UE.

3. The method of claim 2, wherein measuring channel information of the channel from the serving BS/point to the UE comprises:
   receiving an uplink sounding reference signal from the UE; and
   measuring the channel information based on the uplink sounding reference signal.

4. The method of claim 1, wherein measuring channel information of the channel from the serving BS/point to the UE comprises:
  receiving an uplink sounding reference signal from the UE; and
  measuring the channel information based on the uplink sounding reference signal.

5. The method of claim 1, wherein estimating the second interference from the at least one interfering BS/point in the CoMP measurement set to the UE comprises:
  acquiring a beamforming matrix for transmission from the at least one interfering BS/point to the UE;
  acquiring transmission powers of BSs/points in the CoMP measurement set to the UE, path losses of the BSs/points in the CoMP measurement set to the UE, and channel information of a channel from the at least one interfering BS/point to the UE; and
  estimating the second interference based on the transmission powers of the BSs/points in the CoMP measurement set to the UE, the path losses of the BSs/points in the CoMP measurement set to the UE, the acquired beamforming matrix and the acquired channel information.

6. The method of claim 1, wherein obtaining the target CQI based on the first interference and the second interference comprises:
  calculating beamforming gain from the serving BS/point to the UE;
  calculating quality of a channel from the serving BS/point to the UE according to the first interference, the second interference and the beamforming gain; and
  obtaining the target CQI based on the calculated quality.

7. The method of claim 6, wherein calculating the quality of the channel from the serving BS/point to the UE according to the first interference, the second interference and the beamforming gain comprises:
  updating the second interference based on scheduling of the UE by the at least one interfering BS; and
  calculating the quality of a channel from the serving BS/point to the UE according to the first interference, the updated second interference and the beamforming gain.

8. The method of claim 7, wherein updating the second interference based on scheduling of the UE by the at least one interfering BS/point comprises:
  obtaining a scheduling result which comprises information on scheduling of the UE by the at least one interfering BS;
  acquiring a beamforming matrix for transmission from the at least one interfering BS/point to the UE based on the scheduling result;
  estimating a third interference based on the acquired beamforming matrix, channel information of a channel from the at least one interfering BS/point to the UE, transmission powers of BSs/points in the CoMP measurement set to the UE, and path losses of the BSs/points in the CoMP measurement set to the UE; and
  updating the second interference with the third interference.

9. An apparatus for obtaining a Channel Quality Indication (CQI) in a communication system, wherein the communication system comprises a user equipment (UE), a coordinated multi-point (CoMP) measurement set including more than one base station (BS)/point, and one or more outside BSs/points which is outside the CoMP measurement set, and wherein the UE is served by a serving BS/point in the CoMP measurement set and interfered by at least one interfering BS/point in the CoMP measurement set and the one or more outside BSs/points, the apparatus comprising:
  at least one non-transitory memory operable to store program code; and
  at least one processor operable to read said program code and operate as instructed by said program code to:
  estimate a first interference from at least one outside BS/point which is outside the CoMP measurement set to the UE;
  estimate a second interference from at least one interfering BS/point in the CoMP measurement set to the UE; and
  obtain a target CQI based on the first interference and the second interference,
    wherein the operation of estimating the first interference comprises:
      measuring channel information of a channel from the serving BS/point to the UE;
      acquiring CQIs indicating quality of channels from BSs/points in the CoMP measurement set to the UE; and
      estimating the first interference based on the measured channel information and the acquired CQIs.

10. The apparatus of claim 9, wherein the operation of estimating the first interference further comprises:
  acquiring a CQI indicating quality of a channel from a reference BS/point to the UE, wherein the reference BS/point belongs to the at least one interfering BS/point in the CoMP measurement set;
  acquiring a transmission power of the reference BS/point to the UE, a transmission power of the serving BS/point to the UE, a path loss of the reference BS/point to the UE, and a path loss of the serving BS/point to the UE; and
  estimating the first interference based on the measured channel information, the acquired CQI, the transmission power of the reference BS/point to the UE, the transmission power of the serving BS/point to the UE, the path loss of the reference BS/point to the UE, and the path loss of the serving BS/point to the UE.

11. The apparatus of claim 10, wherein operation of measuring the channel information of the channel from the serving BS/point to the UE comprises:
  receiving an uplink sounding reference signal from the UE; and
  measuring the channel information based on the uplink sounding reference signal.

12. The apparatus of claim 9, wherein the operation of measuring the channel information of the channel from the serving BS/point to the UE comprises:
  receiving an uplink sounding reference signal from the UE; and
  measuring the channel information based on the uplink sounding reference signal.

13. The apparatus of claim 9, wherein the operation of estimating the first interference based on the measured channel information comprises:
  acquiring a beamforming matrix for transmission from the at least one interfering BS/point to the UE;
  acquiring transmission powers of BSs/points in the CoMP measurement set to the UE, path losses of the BSs/points in the CoMP measurement set to the UE, and channel information of a channel from the at least one interfering BS/point to the UE; and
  estimating the second interference based on the transmission powers of the BSs/points in the CoMP measurement set to the UE, the path losses of the BSs/points in the CoMP measurement set to the UE, the acquired beamforming matrix and the acquired channel information.

14. The apparatus of claim 9, wherein the operation obtaining the target CQI based on the first interference and the second interfere comprises:
   beamforming gain from the serving BS/point to the UE;
   calculating quality of a channel from the serving BS/point to the UE according to the first interference, the second interference and the beamforming gain; and
   obtaining the target CQI based on the calculated quality.

15. The apparatus of claim 14, wherein the operation of calculating the quality of the channel from the serving BS/point to the UE comprises:
   updating the second interference based on scheduling of the UE by the at least one interfering BS; and
   calculating the quality of a channel from the serving BS/point to the UE according to the first interference, the updated second interference and the beamforming gain.

16. The apparatus of claim 15, wherein the operation of updating the second interference based on scheduling of the UE comprises:
   obtaining a scheduling result which comprises information on scheduling of the UE by the at least one interfering BS;
   acquiring a beamforming matrix for transmission from the at least one interfering BS/point to the UE based on the scheduling result;
   estimating a third interference based on the acquired beamforming matrix, channel information of a channel from the at least one interfering BS/point to the UE, transmission powers of BSs/points in the CoMP measurement set to the UE, and path losses of the BSs/points in the CoMP measurement set to the UE; and
   updating the second interference with the third interference.

\* \* \* \* \*

UNITED STATES PATENT AND TRADEMARK OFFICE
CERTIFICATE OF CORRECTION

PATENT NO. : 9,531,465 B2  
APPLICATION NO. : 14/385064  
DATED : December 27, 2016  
INVENTOR(S) : Gang Wang and Ming Lei Page 1 of 2

It is certified that error appears in the above-identified patent and that said Letters Patent is hereby corrected as shown below:

In the Specification

Column 6, Line 56:
"$H_{m,i}$" has been replaced with --$H_{m,i}$,--;

Column 6, Line 57:
"$SINR_{n,i}$" has been replaced with --$SINR_{n,i}$.--;

Column 9, Line 11:
"13S" has been replaced with --BS--;

Column 9, Line 12:
"$p_m)$" has been replaced with --$P_m)$--;

Column 9, Line 43:
"$\beta_{i,1}$," has been replaced with --$\beta_i,2$,--;

Column 10, Line 8:
After "denoted as" insert --$H_{m,i}$.--;

Column 10, Line 40:
Before "represents" insert --$\beta_i$--;

Column 12, Line 53:
After "interference" insert --$\beta_i$--;

Signed and Sealed this  
Thirteenth Day of March, 2018

Andrei Iancu  
*Director of the United States Patent and Trademark Office*

CERTIFICATE OF CORRECTION (continued)
U.S. Pat. No. 9,531,465 B2

In the Claims

Column 19, Line 6:
"interfere" has been replaced with --interference--;

Column 19, Line 7:
Before "beamforming" insert --calculating--.